April 15, 1969     C. R. NODDINGS ET AL     3,438,602
ENDOTHERMIC FUEL SYSTEM FOR AIR-BREATHING AIRCRAFT
Filed Oct. 20, 1967
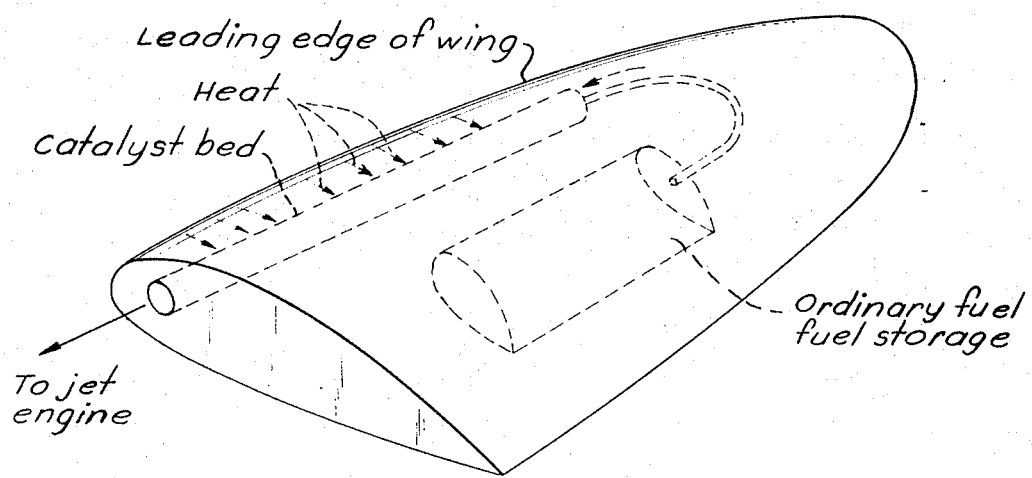
INVENTORS.
Charles R. Noddings
BY James A. Kelly
E J Mooney
ATTORNEY United States Patent Office 3,438,602
Patented Apr. 15, 1969

3,438,602
ENDOTHERMIC FUEL SYSTEM FOR AIR-BREATHING AIRCRAFT
Charles R. Noddings and James A. Kelly, Midland, Mich., assignors to The Dow Chemical Company, Midland, Mich., a corporation of Delaware
Filed Oct. 20, 1967, Ser. No. 676,715
Int. Cl. B64d 37/34; C10g 11/00
U.S. Cl. 244—135  2 Claims

ABSTRACT OF THE DISCLOSURE

A superior fuel for air-breathing aircraft is obtained by catalytically cracking and dehydrogenating ordinary jet fuel at high temperatures.

Background of the invention

A major problem concerning high speed aircraft is that of heat dissipation. The faster an aircraft moves through the air, the greater the heat build-up. At subsonic speed, the problem is not severe because the heat is dispersed into the atmosphere. At supersonic speeds, however, the heat builds up faster than it can be absorbed by the air. One way to dissipate this excess heat is to allow the fuel to "absorb" it. However, this "absorption" results in increased fuel temperatures and the tendency of the fuel to form gum and coke deposits which hamper performance.

Summary of the invention

It has now been found that heat build-up can be controlled and a superior jet fuel obtained by using the heat to catalytically crack and dehydrogenate ordinary jet fuel at high temperatures. This is an endothermic reaction and thus allows ordinary jet fuel to absorb more heat from the aircraft than would otherwise be possible.

In order to practice our invention, ordinary jet fuel is allowed to catalytically crack and dehydrogenate by an endothermic process. The heat required by the endothermic reaction comes from the heat build-up on the aircraft. We prefer to incorporate the catalyst bed so that its container is the leading edge of the wing. Of course, the leading edges of the tail assembly may also be used. Reference to the accompanying drawing will facilitate an understanding of the invention.

Thus, the preferred method of practicing our invention is to fly the aircraft with its ordinary fuel until the heat build-up is such that it is desirable to dissipate such heat. At this point, the ordinary fuel is then allowed to pass, by any liquid transfer means (e.g. a mechanical pump), into the catalyst bed which is incorporated into the leading edge of the wing. Here the ordinary fuel is heated, vaporized, superheated, cracked and dehydrogenated by an endothermic process which absorbs heat. The exit gas is then allowed to burn in the jet by conventional means. By use of the process, ordinary fuel is used to dissipate heat from the aircraft not only by way of the sensible heat and latent heat of vaporization of the fuel but also by the endothermic heaters of cracking and dehydrogenation.

The ordinary fuel is stored by conventional means in a storage tank within the aircraft and is at all times therein in a liquid state at a pressure around one to two atmospheres and a temperature between 0 and 300° C. The temperature range within the catalyst bed during dehydrogenation and cracking is between 500° and 900° C. and the pressure along the catalyst bed varies but is around one to three atmospheres. The flow rate of the liquid fuel into the catalyst bed may vary from 1 to 16 parts by weight of liquid feed per hour per weight of catalyst.

By the term ordinary jet fuel, we mean to include those consisting essentially of aliphatic and aromatic hydrocarbons. Examples of suitable ordinary jet fuels are naphthenic kerosenes (e.g. JP–1), gasoline-kerosene blends (e.g. JP–3, JP–4, JP–5, ASTM Type A), and kerosene types which are higher cuts than JP–4 (e.g. JP–6, ASTM Type A–1, ASTM Type B).

The catalyst used is any catalyst which will both crack and dehydrogenate ordinary jet fuel by way of an endothermic reaction. Suitable catalysts include the cobalt phosphate type (U.S. 3,321,544), the chromium zinc phosphate type (U.S. 3,327,002), the iron nickel phosphate type (U.S. 3,327,003), the chromium copper phosphate type (U.S. 3,327,004), the chromium aluminum phosphate type (U.S. 3,327,005), the chromium iron phosphate type (U.S. 3,327,006), the nickel copper phosphate type (U.S. 3,327,007), the nickel iron phosphate type (U.S. 3,327,008), the calcium iron phosphate type (U.S. 3,327,009), the chromium calcium phosphate type (U.S. 3,327,010), the iron chromium phosphate type (U.S. 3,327,011), the iron aluminum phosphate type (U.S. 3,327,012), and the calcium nickel phosphate type (Serial No. 634,888, filed May 1, 1967, entitled "Basic Precipitation with Nickel Phosphate Catalyst," Noddings and Gates), the nickel, nickel chromium and chromium nickel types (Serial No. 604,661, filed December 27, 1966, entitled "Catalyst and Method for Dehydrogenating and Cracking Alkanes and Olefins," Noddings, Dietzler and Gates), the zinc nickel and nickel zinc types (Serial No. 604,623, filed December 27, 1966, entitled "Phosphate Catalyst and Method for Dehydrogenating and Cracking Alkanes and Olefins," Noddings and Gates). The numbers following each type of catalyst are the patent or serial numbers of patents or applications which are hereby incorporated by reference.

Description of preferred embodiments

We have used our invention to crack and dehydrogenate JP–6 fuel. Because of the wide product range received, it is best to demonstrate the heat sink by sample calculations.

To illustrate the heat "absorption" capacity of the fuel, the following calculations are presented. Assume that we are dealing with a $C_{10}H_{22}$ feed stream. The product of catalytically cracking and dehydrogenating is predominantly $CH_4$, $C_2H_4$, $C_3H_6$, $C_4H_8$ with some $H_2$. Assume the reaction occurs at 1000° K. and the temperature of the starting fuel in the storage tank is 300° K. The heat sink is illustrated by the following calculations.

Cracking:

$\Delta H_R$ at 1000° K. = 50,300 cal./mole (endothermic)

Dehydrogenation:
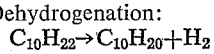

$\Delta H_R$ at 1000° K. = 28,000 cal./mole (endothermic)

Assume 65% cracking and 20% dehydrogenation:

|  | B.t.u./lb. fuel |
|---|---:|
| Heat of cracking (percent conversion) ($\Delta H_R$)/(M.W.) | 450 |
| Dehydrogenation (percent conversion) ($\Delta H_R$)/(M.W.) | 83 |
| Sensible heat from 300° to 1000° K. | 850 |
| Heat vaporization | 125 |
| Total heat sink | 1510 |

Similar calculated results are obtained using the other ordinary jet fuels as defined above.

We claim:
1. A method for flying an air-breathing aircraft comprising passing ordinary jet fuel through a catalyst bed, which is incorporated into the leading edge of the wings, at a flow rate between 1 and 16 parts by weight of liquid feed per hour per weight of catalyst, dehydrogenating and cracking said fuel in the catalyst bed at a temperature between 500° and 900° C. and a pressure between one and three atmospheres, and using the product of the said cracking and dehydrogenating process as the fuel for the aircraft.

2. A method as defined in claim 1 wherein the catalyst is the calcium nickel phosphate type.

References Cited

UNITED STATES PATENTS

| 2,346,809 | 4/1944 | Woods | 244—135 |
| 2,624,711 | 1/1953 | Williamson | 252—372 |
| 3,015,461 | 1/1962 | Fineblum | 244—135 X |
| 2,941,372 | 6/1960 | Taylor | 244—135 X |

FERGUS S. MIDDLETON, *Primary Examiner.*

J. PITTENGER, *Assistant Examiner.*

U.S. Cl. X.R.

208—113